United States Patent
Burckart et al.

(10) Patent No.: US 8,478,598 B2
(45) Date of Patent: Jul. 2, 2013

(54) APPARATUS, SYSTEM, AND METHOD FOR VOICE CHAT TRANSCRIPTION

(75) Inventors: Erik J. Burckart, Raleigh, NC (US); Steve R. Campbell, Lillington, NC (US); Andrew Ivory, Wake Forest, NC (US); Aaron K. Shook, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 11/840,276

(22) Filed: Aug. 17, 2007

(65) Prior Publication Data

US 2009/0048845 A1 Feb. 19, 2009

(51) Int. Cl.
*G10L 11/00* (2006.01)

(52) U.S. Cl.
USPC ............. 704/270; 725/87; 715/716; 709/224; 709/207; 709/206; 705/26.43; 704/277; 704/260; 704/251; 704/246; 704/235; 455/412.1; 379/88.01; 379/202.01; 370/352; 370/260; 348/14.09

(58) Field of Classification Search
USPC ............... 379/202.01, 88.14, 88.01; 704/235, 704/277, 260, 251, 246; 370/352, 360; 715/716; 709/207, 224, 206; 725/87; 705/26.43; 455/412.1; 348/14.09
See application file for complete search history.

(56) References Cited

U.S. PATENT DOCUMENTS

| | | | |
|---|---|---|---|
| 7,085,258 B2 | 8/2006 | Creamer et al. | |
| 7,092,888 B1 * | 8/2006 | McCarthy et al. | ............ 704/277 |
| 7,236,931 B2 * | 6/2007 | He et al. | ......................... 704/235 |
| 7,308,082 B2 * | 12/2007 | Davis et al. | ................ 379/88.14 |
| 7,539,619 B1 * | 5/2009 | Seligman et al. | ............. 704/277 |
| 8,265,930 B1 * | 9/2012 | Jones et al. | ..................... 704/235 |
| 2002/0120939 A1 * | 8/2002 | Wall et al. | ........................ 725/87 |
| 2003/0016657 A1 * | 1/2003 | Creamer et al. | .............. 370/352 |
| 2003/0105822 A1 * | 6/2003 | Gusler et al. | ................... 709/206 |
| 2004/0158630 A1 * | 8/2004 | Chang et al. | ................... 709/224 |
| 2004/0172245 A1 * | 9/2004 | Rosen et al. | ................... 704/235 |
| 2004/0267527 A1 * | 12/2004 | Creamer et al. | .............. 704/235 |
| 2005/0091123 A1 * | 4/2005 | Freishtat et al. | ................ 705/26 |
| 2005/0144247 A1 * | 6/2005 | Christensen et al. | ......... 709/207 |
| 2005/0187781 A1 * | 8/2005 | Christensen | ...................... 705/1 |
| 2005/0206721 A1 * | 9/2005 | Bushmitch et al. | ........ 348/14.09 |
| 2005/0238156 A1 * | 10/2005 | Turner | ..................... 379/202.01 |
| 2006/0166650 A1 * | 7/2006 | Berger et al. | .............. 455/412.1 |
| 2007/0078656 A1 * | 4/2007 | Niemeyer et al. | ............. 704/260 |
| 2007/0081637 A1 * | 4/2007 | Beard et al. | ................ 379/88.01 |
| 2007/0124144 A1 * | 5/2007 | Johnson | ........................ 704/246 |

(Continued)

OTHER PUBLICATIONS

Vax VoIP activeX SDK 3.0, available at http://www.freedownloadscenter.com/Programming/ActiveX/Vax_VoIP_activeX_SDK.html, last visited Jun. 18, 2007, pp. 1-2.

*Primary Examiner* — Michael Colucci
(74) *Attorney, Agent, or Firm* — Jeffrey T. Holman

(57) ABSTRACT

An apparatus, system, and method to transcribe a voice chat session initiated from a text chat session. The system includes a chat server, a voice server, and a transcription engine. The chat server is configured to facilitate a text chat session between multiple instant messaging clients. The voice server is coupled to the chat server and configured to facilitate a transition from the text chat session to a voice chat session between the multiple instant messaging clients. The transcription engine is coupled to the voice server and configured to generate a voice transcription of the voice chat session. The voice transcription may be aggregated into a text chat history.

20 Claims, 9 Drawing Sheets

U.S. PATENT DOCUMENTS

| | | | |
|---|---|---|---|
| 2007/0133437 A1* | 6/2007 | Wengrovitz et al. | 370/260 |
| 2007/0206760 A1* | 9/2007 | Bandhole et al. | 379/202.01 |
| 2008/0059177 A1* | 3/2008 | Poirier et al. | 704/251 |
| 2008/0250109 A1* | 10/2008 | Jakobson | 709/206 |
| 2009/0019367 A1* | 1/2009 | Cavagnari et al. | 715/716 |
| 2009/0049138 A1* | 2/2009 | Jones et al. | 709/206 |

* cited by examiner

US 8,478,598 B2

APPARATUS, SYSTEM, AND METHOD FOR VOICE CHAT TRANSCRIPTION

BACKGROUND OF THE INVENTION

Some instant messaging (IM) clients offer the ability to launch a voice chat session directly from a text chat session. A common scenario that occurs during an IM session is that the chatting parties agree to continue the IM session using audible communication, so they initiate a voice chat session. Voice chat sessions can occur using a telephone line on a public switched telephone network (PSTN) or through internet protocol (IP) telephony such as voice over IP (VoIP).

However, the information from the voice chat session is not typically saved. Hence, the information exchanged during the voice chat session is lost, and it is impossible to review the verbal interaction that occurred between the chatting parties.

Other conventional chat systems do have the ability to save a copy of the voice file for later review by one of the chatting parties. However, these conventional systems simply store the voice information in an audio file (e.g., a .wav file), which can be burdensome because of compatibility issues with audio players, the amount of storage consumed to store the audio files, and the inability to quickly review or search the audio files. Additionally, these conventional chat systems store the audio files separately from the chat history, so it is difficult to coordinate between the audio files and the corresponding text chat histories.

SUMMARY OF THE INVENTION

Embodiments of a system are described. In one embodiment, the system is a system to transcribe a voice chat session. The system includes a chat server, a voice server, and a transcription engine. The chat server is configured to facilitate a text chat session between multiple instant messaging clients. The voice server is coupled to the chat server and configured to facilitate a transition from the text chat session to a voice chat session between the multiple instant messaging clients. The transcription engine is coupled to the voice server and configured to generate a voice transcription of the voice chat session. Other embodiments of the system are also described.

Embodiments of an apparatus are also described. In one embodiment, the apparatus is an apparatus to store a chat history log with both text data and voice transcription data. The apparatus includes a local instant messaging client coupled to a client memory. The local instant messaging client is configured to facilitate a chat session with a remote instant messaging client via a chat server. The client memory is configured to store a chat history log associated with the chat session between the local instant messaging client and the remote instant messaging client. The local instant messaging client is further configured to aggregate text data and voice transcription data from the chat server into the chat history log. Other embodiments of the apparatus are also described.

Embodiments of a method are also described. In one embodiment, the method is a method for transcribing a voice stream of a voice chat session. The method includes transitioning between a text chat session and a voice chat session between multiple instant messaging clients. The method also includes transcribing a voice stream of the voice chat session to generate voice transcription data associated with the voice chat session. The method also includes storing the voice transcription data on a transcription memory coupled to a voice server. Other embodiments of the method are also described.

Embodiments of a computer program product are also described. In one embodiment, the computer program product includes a computer useable storage medium to store a computer readable program. When the computer readable program is executed on a computer, the computer readable program causes the computer to perform operations relate to transcribing a voice stream of a voice chat session. The operations include an operation to transition between a text chat session and a voice chat session between multiple instant messaging clients. The operations also include an operation to transcribe a voice stream of the voice chat session to generate voice transcription data associated with the voice chat session. The operations also include an operation to store the voice transcription data on a transcription memory coupled to a voice server. Other embodiments of the computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate transcribing a voice stream in a voice chat session. The voice chat session may originate from an instant messaging (IM) session including a text chat session, which generates a chat history log. The transcribed voice data is then aggregated with the text chat history in the chat history log. In some embodiments, aggregation of the voice and text chat histories into a single chat history log is accomplished using timestamps to chronologically order the voice and text chat histories.

An embodiment of a system uses a voice server, which inserts itself in the voice stream between the clients and transcribes the voice conversation. The voice server also may add timestamps to the transcribed voice data. A chat history service (e.g., a capability published using methods such as SIP/SIMPLE (session initiation protocol/session initiation protocol for instant messaging and presence leveraging extensions)) on each instant messaging client, connected together via the voice server, aggregates the transcribed voice data with the text data using the timestamps. Other embodiments are also described below with specific reference to the corresponding figures.

Figure 1:
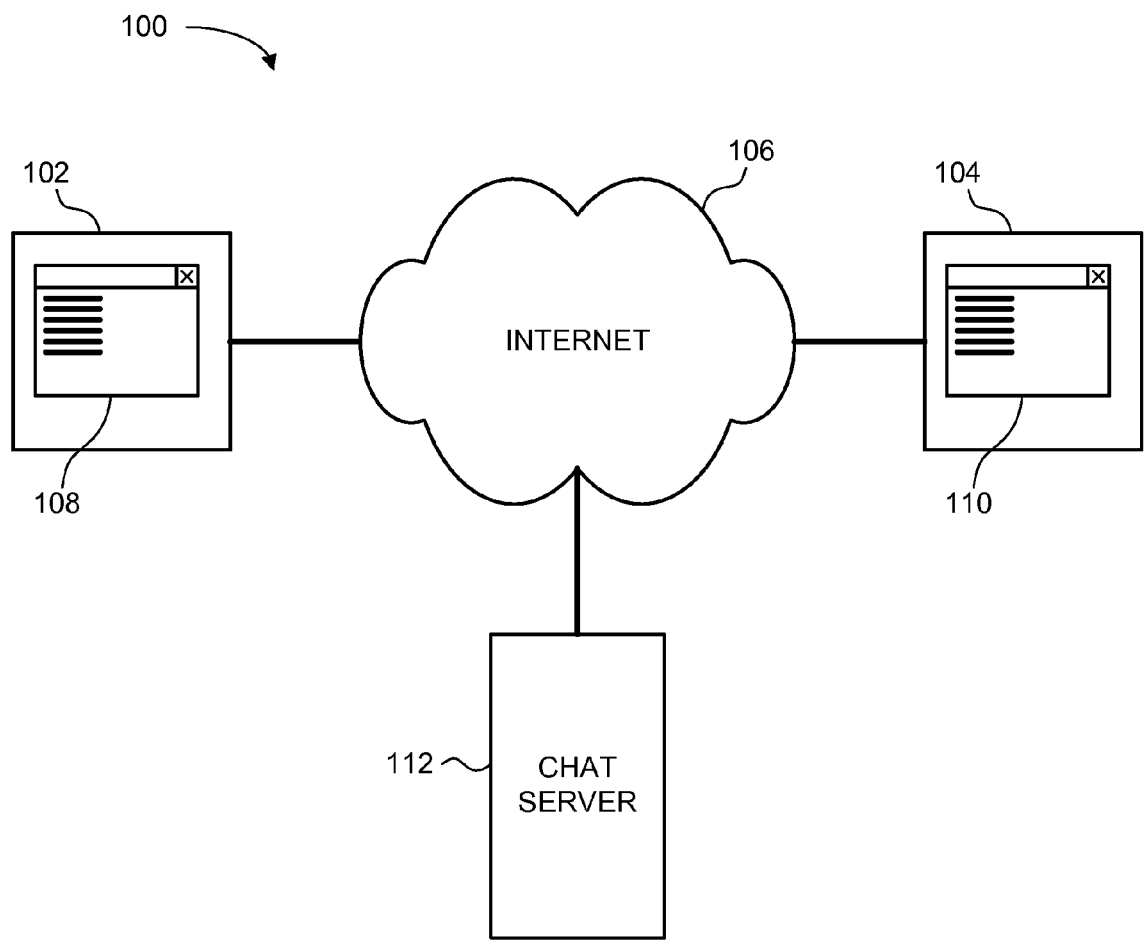
FIG. 1 depicts a schematic block diagram of one embodiment of an instant messaging system.

FIG. 1 depicts a schematic block diagram of one embodiment of an instant messaging (IM) system 100. The illustrated IM system 100 includes multiple nodes 102 and 104 connected together via a computer communication network such as the internet 106. The nodes 102 and 104 are also referred to, in some instances, as client computers 102 and 104. Each of the nodes 102 and 104 may be referred to as a sending node and/or a receiving node, depending on the direction of data flow between the nodes 102 and 104 at any given time. It should also be noted that the IM system 100 may include more than two nodes. Each node 102 and 104 implements an IM client (represented by the depicted IM user interfaces 108 and 110) so that an IM session may be realized between the IM clients.

Figure 4:
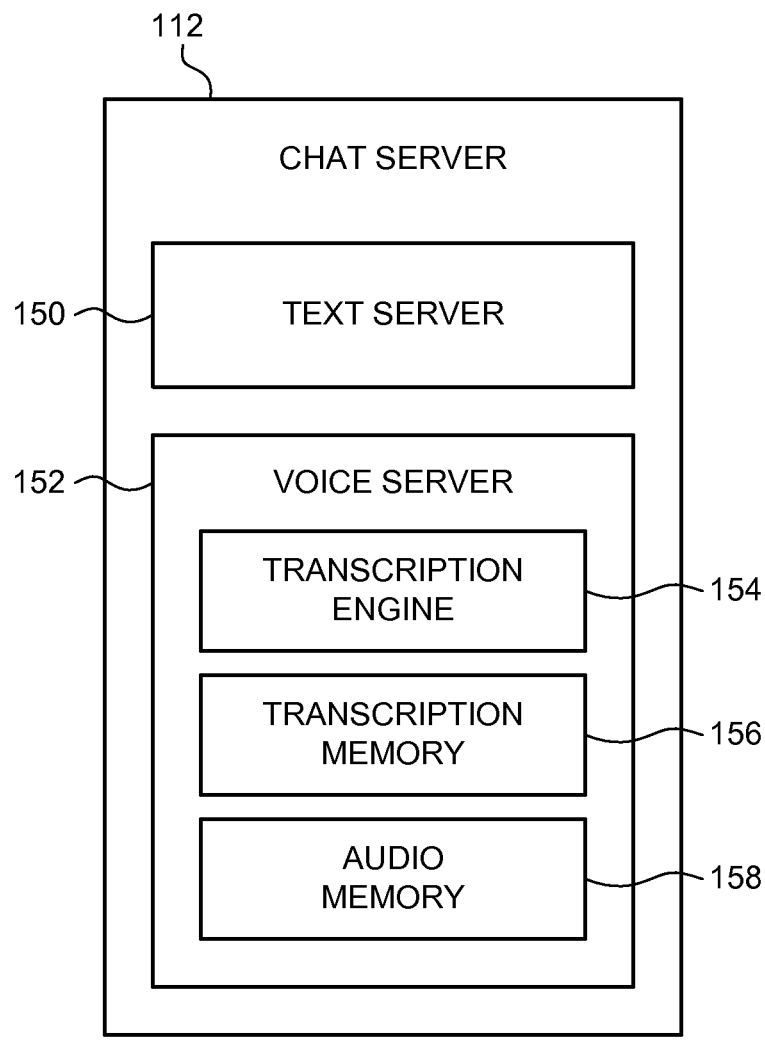
FIG. 4 depicts a schematic block diagram of one embodiment of the chat server of the instant messaging system of FIG. 1.

The illustrated IM system 100 also includes a chat server 112 to facilitate an IM session between the multiple nodes 102 and 104. One example of the chat server 112 is shown in FIG. 4 and described in more detail below. In some embodiments, the chat server 112 facilitates a text chat session between the IM clients on the various nodes 102 and 104. Additionally, where more than two nodes and IM clients are present within the IM system 100, the chat server 112 may facilitate a single IM session among more than two nodes, or multiple IM sessions between the same or different nodes within the IM system 100. It should be noted that the configurations of the nodes 102 and 104, the IM clients, and the chat server 112 are not limited to particular hardware or software implementations. For example, multiple chat servers 112 may be present within the IM system 100 to facilitate multiple simultaneous IM sessions.

When instant messages are transmitted, for example, from the sending node 102 to the receiving node 104, the instant messages are parsed and may be displayed to users via the IM user interfaces 108 and 110 at the corresponding nodes 102 and 104. Additionally, the instant message transmissions may include information pertaining to the sending user, information pertaining to the receiving user, and other pertinent data. This data can be extracted from the instant message and optionally displayed by the IM user interfaces 108 and 110. Examples of pertinent data include references to the sender and one or more recipients, by user name and/or network IP addresses. Pertinent data also can include a message subject, timestamps, or other data. Timestamps may include a date and/or time corresponding to the transmitted instant message.

Additionally, a voice communications identifier can be included in the instant message to indicate that a voice communications link can be established between the nodes 102 and 104. Upon receipt of an instant message, the receiving IM client can detect the voice communications identifier when parsing the instant message. In response, the receiving IM client detects the voice communications identifier in the instant message, and the receiving user can accept or decline the voice communications request. Acceptance of the voice communications request allows establishment of a voice communications link between the nodes 102 and 104. Although the voice communications link can be provided through any suitable voice communications technology, at least one embodiment establishes the voice communications link over the internet 106 based upon the established Voice over IP (VoIP) protocol. Other embodiments may use other protocols or technologies to establish the voice communications link between the nodes 102 and 104.

Figure 2:
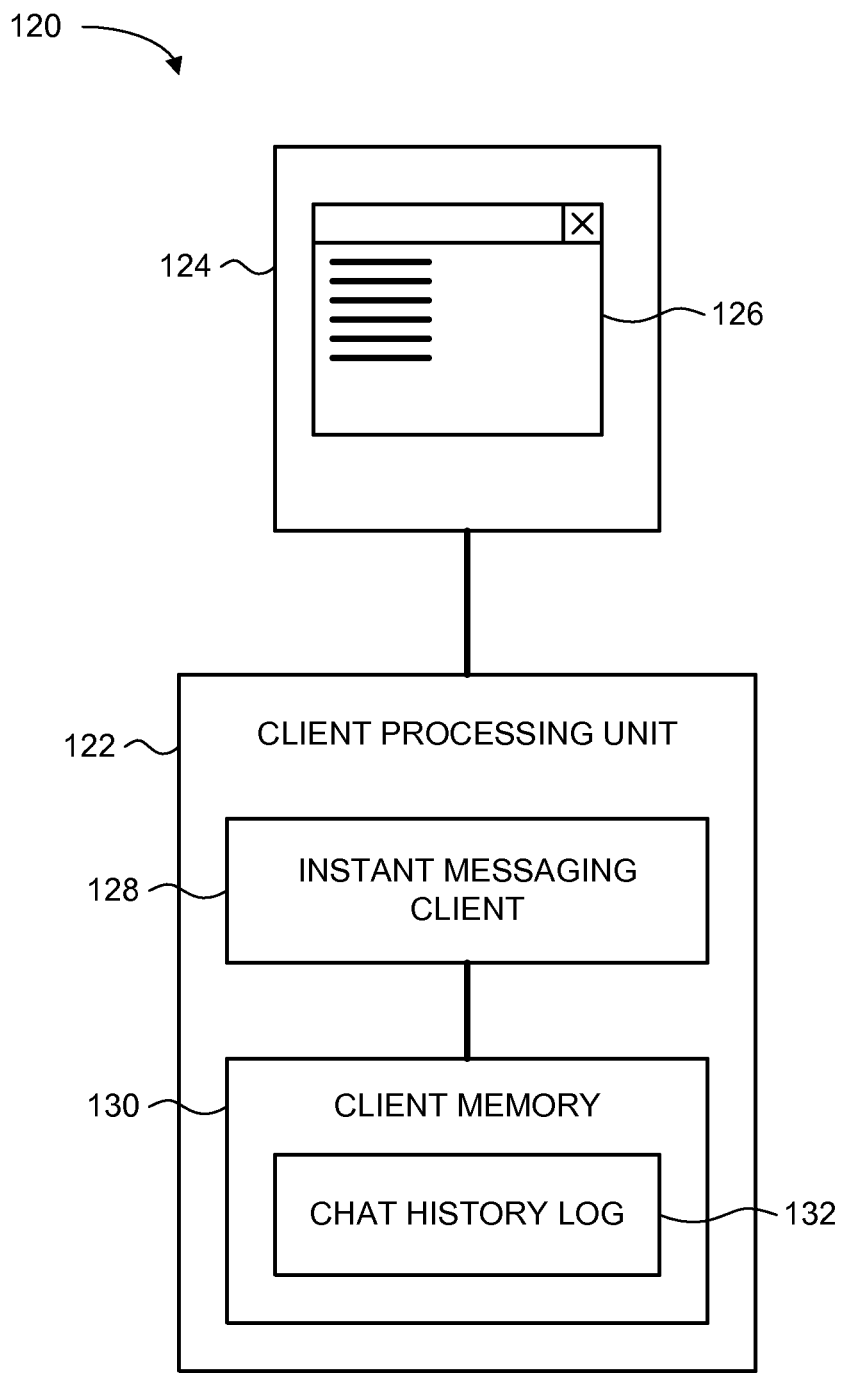
FIG. 2 depicts a schematic block diagram of one embodiment of the client computer of the instant messaging system of FIG. 1.

FIG. 2 depicts a schematic block diagram of one embodiment of the client computer 120 that is substantially similar to the nodes 102 and 104 of the IM system 100 of FIG. 1. The illustrated client computer 120 includes a client processing unit 122 and a display device 124. In some embodiments, the display device 124 may display an IM user interface 126, similar to the IM user interfaces 108 and 110 described above.

Figure 3:
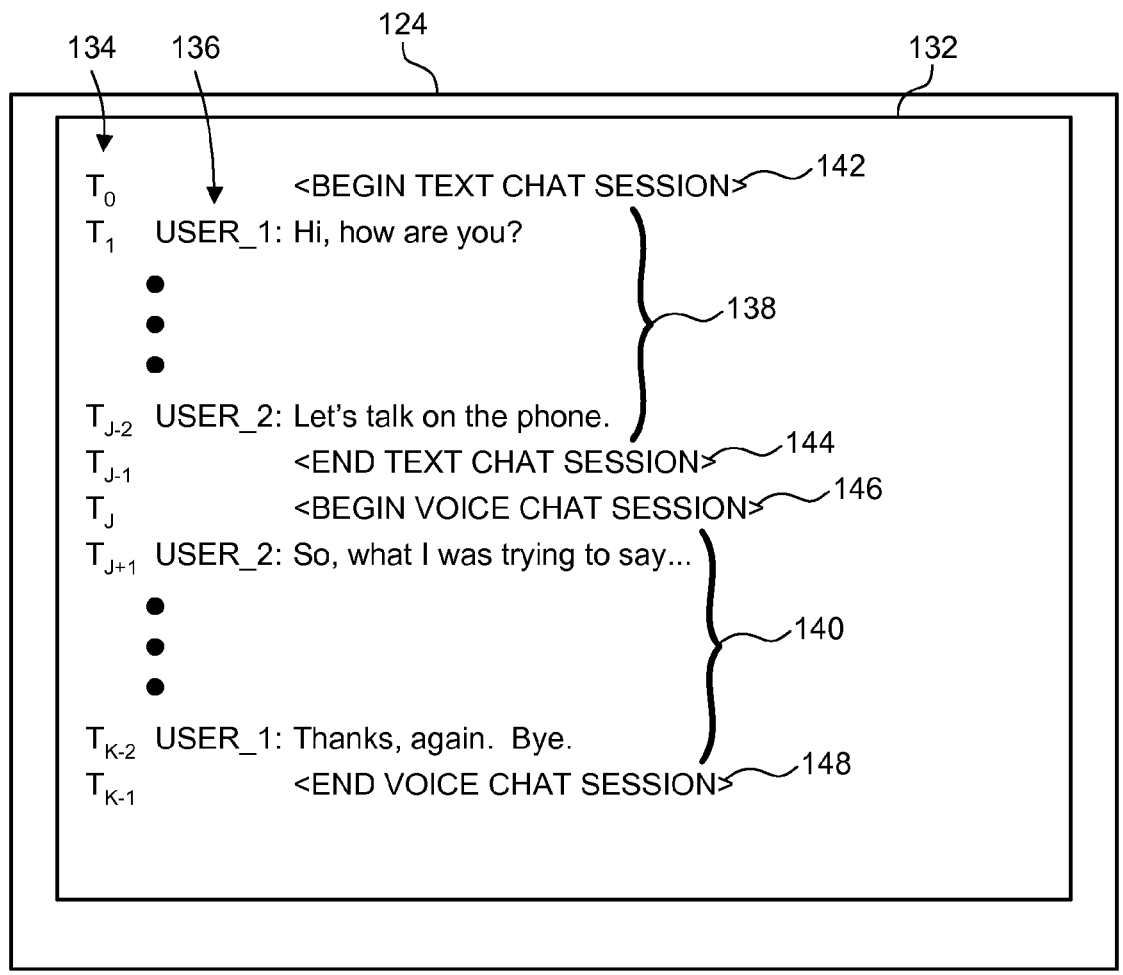
FIG. 3 depicts an exemplary embodiment of the chat history log stored on the client computer of FIG. 2.

The client processing unit 122 includes an IM client 128 and client memory 130. The client memory 130 is coupled to the IM client 128 and stores a chat history log 132. One example of a chat history log 132 is shown in FIG. 3 and described in more detail below. Some embodiments of the client memory 130 also store other data in addition to the chat history log 132.

The IM client 128 facilitates a chat session with a remote IM client on another client computer. As described above, the chat server 112 facilitates the chat session between the local and remote IM clients. The chat history log 132 stored in the client memory 130 is associated with the chat session between the local IM client and the remote IM client. In some embodiments, the local IM client 128 is configured to aggregate both text data and voice transcription data from the chat server 112 into the chat history log 132. In this way, a user may view the chat history log 132, including the text and voice transcription data, on the display device 124.

In some embodiments, the IM client 128 receives the text data and the voice transcription data from the chat server 112. The IM client 128 then chronologically aggregates the text data and the voice transcription data according to timestamps associated with the text data and the voice transcription data. Hence, the chat history log 132 provides an accurate representation of the conversation that occurs between the local IM client 128 and the remote IM client, regardless of the chat method (e.g., text or voice) that is used. Additionally, the IM client 128 may add a voice transcription indicator to the chat history log 132 to identify at least a portion of the voice transcription data in the chat history log 132. Similarly, the IM client 128 may add a text indicator to the chat history log 132 to identify at least a portion of the text data in the chat history log 132.

FIG. 3 depicts an exemplary embodiment of the chat history log 132 stored on the client computer 120 of FIG. 2. As explained above, the chat history log 132 may be stored in the client memory 130 and displayed on the display device 124 for review by a user. Although the chat history log 132 of FIG. 3 is shown with specific content and a particular visual layout, other embodiments may provide more or less content and may use a different visual layout in one or more aspects.

In the depicted embodiment, the chat history log 132 includes timestamps 134 to indicate the order in which each instant message occurs. The timestamps 134 are designated as $T_0$-$T_{K-1}$, although other timestamp designations may be used. The illustrated chat history log 132 also includes speaker indicators 136 to indicate which instant message originates from each user. For example, the instant messages of the chat history log 132 originate from either USER_1 or USER_2. In some embodiments, the speaker indicators 136 may be user names, network IP addresses, or other types of speaker indicators.

The illustrated chat history log 132 also includes text data 138 and voice transcription data 140. The text data 138 is identified by text indicators 142 and 144 to indicate the beginning and end of the text data 138 of the text chat session (corresponding to timestamps $T_0$-$T_{J-1}$). Similarly, the voice transcription data 140 is identified by voice transcription indicators 146 and 148 to indicate the beginning and end of the voice transcription data 140 of the voice chat session (corresponding to timestamps $T_J$-$T_{K-1}$). Although beginning and end indicators are shown in FIG. 3, other embodiments may use one indicator or the other. Additionally, some embodiments may use a different type of indicator. For example, some embodiments may use colors, icons, page formatting, or another visual indicator to identify some or all of the text data 138 and/or the voice transcription data 140.

FIG. 4 depicts a schematic block diagram of one embodiment of the chat server 112 of the IM system 100 of FIG. 1. The illustrated chat server 112 includes a text server 150 and a voice server 152. The voice server 150 includes a transcription engine 154, a transcription memory 156, and an audio memory 158. Although certain components of the chat server 112 are shown and described herein, other embodiments may implement fewer or more components and provide more or less functionality than the components shown in FIG. 3.

In one embodiment, the chat server 112 facilitates a text chat session between multiple IM clients. In particular, the text server 150 of the chat server 112 processes text data that is sent between the IM clients. Processing text data of instant messages is known, generally, and is not described in more detail herein.

In one embodiment, the voice server 152 is coupled to the chat server 150 and facilitates a transition from the text chat session to a voice chat session between the multiple IM clients. For example, the voice server 152 may transition from a text chat session to a voice chat session that is implemented using a typical voice over internet protocol (VoIP). Additionally, the voice server 152 may facilitate a transition from the voice chat session back to the text chat session within the same IM session. Hence, the voice server 152 may facilitate one or more transitions between the text chat session and the voice chat session. Additional details of such transitions are known and are not described herein. Also, it should be noted that the ability of the voice server 152 to provide voice transcription data to one or more IM clients 108 and 110 does not necessarily depend on the manner in which the voice chat session is implemented.

In one embodiment, the transcription engine 154 generates a voice transcription of the voice chat session. The transcription engine 154 may generate the voice transcription in approximately real-time during the voice chat session (e.g., the transcription engine 154 processes the voice stream as it is directed from the sending IM client to the receiving IM client) or, alternatively, after the voice chat session ends. In either case, the transcription engine 154 uses proprietary or commercially available transcription program in order to generate the voice transcription. The voice transcription includes voice transcription data that may be stored, at least temporarily, in the transcription memory 156. Alternatively, the voice transcription data may be sent directly to one or more IM clients.

If the transcription engine 154 does not transcribe the voice stream in real time, some embodiments of the voice server 152 store at least a portion of the voice stream in the audio memory 158 so that the transcription engine 154 can transcribe the audio file at a later time. Additionally, the voice stream may be stored as an audio file in the audio memory 158 even if the transcription engine 154 transcribes the voice stream in approximately real time. Thus, in one embodiment, the voice server 152 may send the audio file to one or more IM clients to be stored with the chat history log 132. As an alternative, the voice transcription may be generated by the IM clients, or at the client computers 102 and 104, using the audio file, instead of generating the voice transcription at the chat server 112. In this scenario, corresponding components and/or functionality may be implemented in conjunction with the IM clients.

Whether the transcription engine 154 generates the voice transcription data during or after the voice chat session, the voice server 152 sends the voice transcription data to the IM clients. Each IM client that receives the voice transcription data may store the voice transcription data in the client memory 130 until it is aggregated with the chat history log 132. Once the voice transcription data is aggregated with the text data in the chat history log 132, the chat history log 132 includes a substantially comprehensive text record of both the text and voice activities from the IM session. As explained above, some embodiments aggregate the voice transcription data and the text data according to timestamps associated with the voice transcription data and the text data. Other embodiments may aggregate the text data and the voice transcription data in another manner. Additionally, the transcription engine 154 may add one or more speaker indicators 136 to the voice transcription data in order to associate part of all of the voice transcription data with one or more users.

Figure 5:
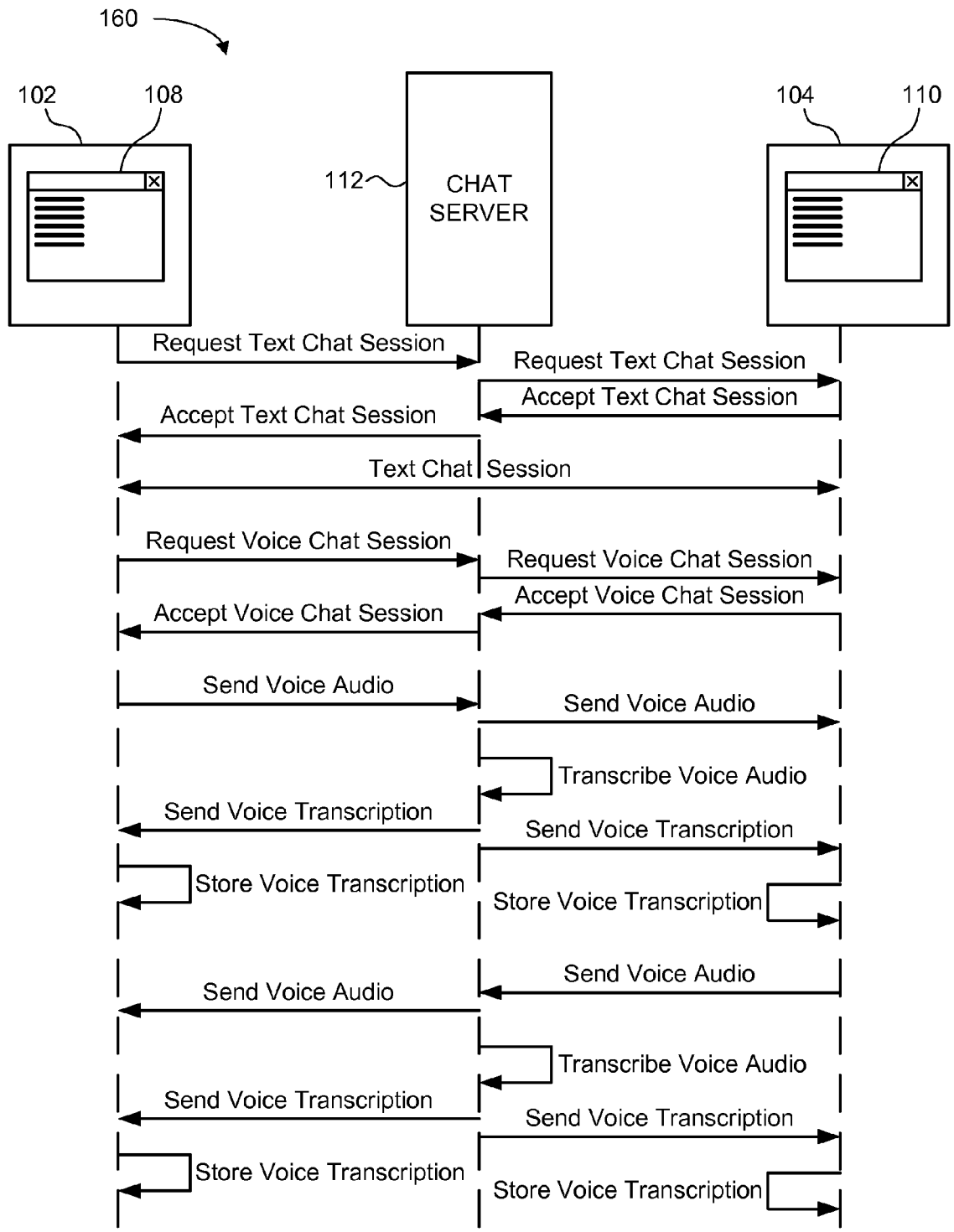
FIG. 5 depicts a schematic flow diagram of one embodiment of an instant messaging chat session which includes both text chat and voice chat sessions.

FIG. 5 depicts a schematic flow diagram of one embodiment of an IM chat session 160 which includes both text chat and voice chat sessions. For convenience, the IM chat session 160 is depicted with only two client computers 102 and 104, although some embodiments may facilitate IM chat sessions with any number of two or more client computers. Similarly, the IM chat session 160 is depicted with only two corresponding IM clients, although some embodiments may facilitate IM chat sessions with any number of two or more IM clients.

In general, the IM chat session 160 may include several operations involving the IM clients and the chat server 112. In one embodiment, the IM chat session 160 includes transitioning between a text chat session and a voice chat session between multiple IM clients. The IM chat session 160 also includes transcribing a voice stream of the voice chat session to generate voice transcription data associated with the voice chat session. The IM chat session 160 also includes storing the voice transcription data on a transcription memory 156 coupled to a voice server 152. A further embodiment of the IM chat session 160 includes sending the voice transcription data and text data to one of the IM clients for storage in a chat history log 132. Another embodiment of the IM chat session 160 includes storing the voice transcription data and the text data in the chat history log 132 of the corresponding IM client. More specific details of the illustrated IM chat session 160 are described below.

The depicted IM chat session 160 begins when the first IM client sends a request to the chat server 112 to begin a text chat session. The chat server 112 then processes and forwards the request to the second IM client. In response to the request, the second IM client sends a transmission to the chat server 112 to accept the request for the text chat session. The chat server 112 then processes and forwards the acceptance to the first IM client. After establishing the text chat session, the first and second IM clients proceed to transmit and receive instant messages via the chat server 112.

At some point, the first IM client sends a request to the chat server 112 to begin a voice chat session. The chat server 112 then processes and forwards the request to the second IM client. In response to the request, the second IM client sends a transmission to the chat server 112 to accept the request for the voice chat session. The chat server 112 then processes and forwards the acceptance to the first IM client. After establishing the voice chat session, the first and second IM clients proceed to transmit and receive audio messages via the chat server 112.

Each time an audio message is sent from one of the IM clients to the chat server 112, the voice server 152 coupled to the chat server 112 employs the transcription engine 154 to generate voice transcription data corresponding to the processed audio message. The voice server 152 then sends the voice transcription data to each of the IM clients for storage in the corresponding chat history log 132.

It should be noted that portions of the IM chat session 160 may be implemented even if less than all of the participating IM clients are capable of storing voice transcription data. Additionally, some embodiments allow the IM clients to selectively enable and disable the voice transcription functionality. For example, users of the IM clients 108 and 110 may independently turn off the functionality that would otherwise create the chat history log 132 and aggregate the voice transcription data with the text data in the chat history log 132.

Figure 6:
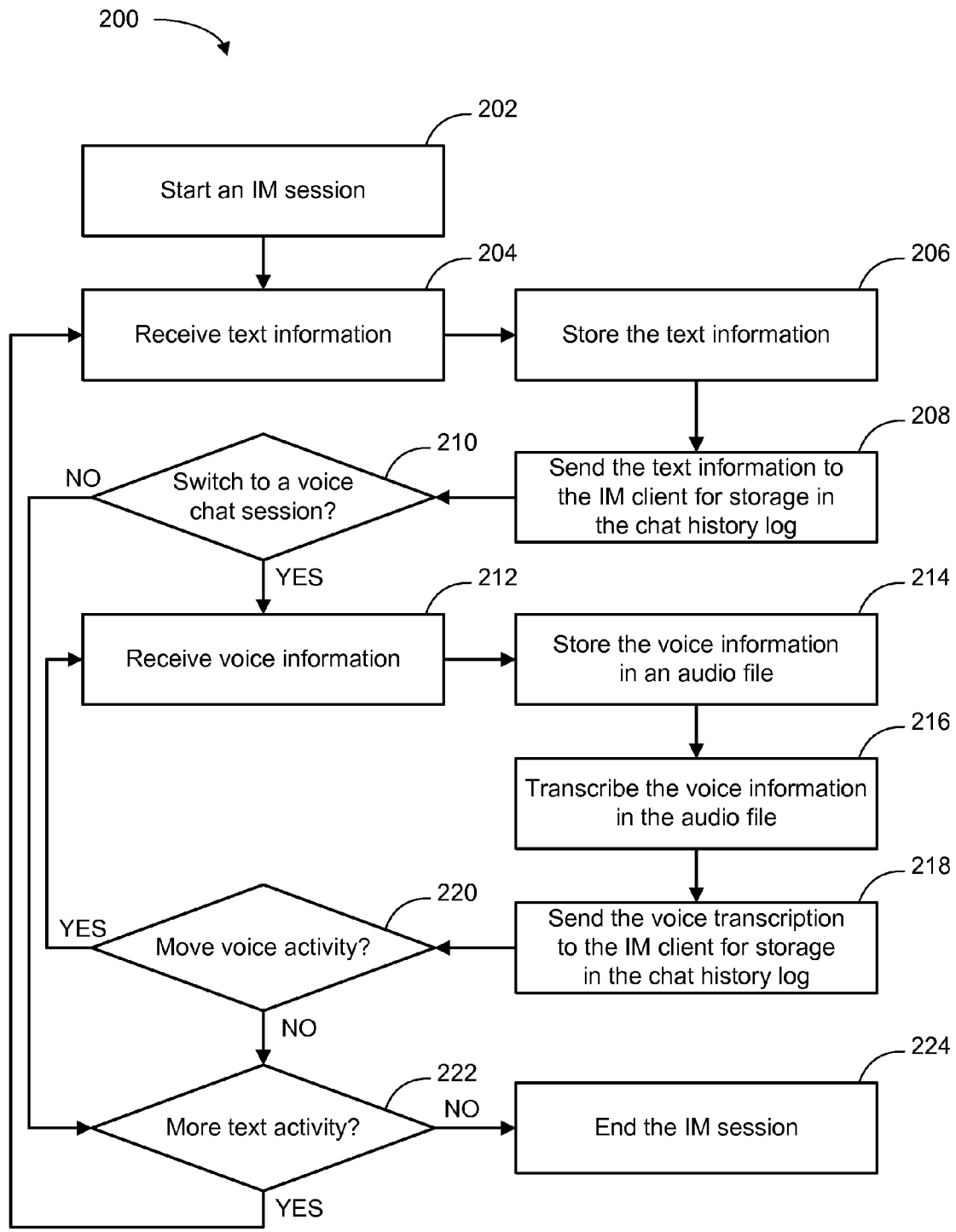
FIG. 6 depicts a schematic flow chart diagram of one embodiment of a method for transcribing voice information during a voice chat session.

FIG. 6 depicts a schematic flow chart diagram of one embodiment of a method 200 for transcribing voice information during a voice chat session. For ease of explanation, the voice transcription method 200 is described with reference to the IM system 100 of FIG. 1 and, in particular, to the chat server 112 of FIG. 4. However some embodiments of the voice transcription method 200 may be implemented with other IM systems and/or chat servers.

In the illustrated voice transcription method 200, the IM clients start 202 an IM session via the chat server 112. The chat server 112 then receives 204 text information from the sending IM client and locally stores 206 the text information. In one embodiment, the text server 150 processes the text information. The chat server 112 then sends 208 the text information to each of the IM clients for storage in the corresponding chat history logs 132.

The chat server 112 then determines 210 if there is a request to switch from the text chat session to a voice chat session and, if so, receives 212 voice information. The voice server 152 then stores 214 the voice information in an audio file. Subsequently, the transcription engine 154 transcribes 216 the voice information in the audio file to generate voice transcription data. In one embodiment, the voice server 152 stores the voice transcription data in the transcription memory 156. The voice server 152 then sends 218 the voice transcription data to each of the IM clients for storage in the corresponding chat history logs 132. In one embodiment, the IM clients aggregate the voice transcription data with the text data in a single chat history log 132.

The voice server 152 then determines 220 if there is additional voice activity and, if so, returns to receive 212 the additional voice information. Otherwise, if there is not additional voice activity, then the text server 150 determines 222 if there is additional text activity. If there is additional text activity, then the text server 150 returns to receive 204 the additional text information. Hence, the illustrated voice transcription method 200 continues processing text and voice information, and storing text and voice transcription data in the chat history log 132, until there is no more voice or text activity. The IM session then ends and the depicted voice transcription method 200 ends.

Figure 7:
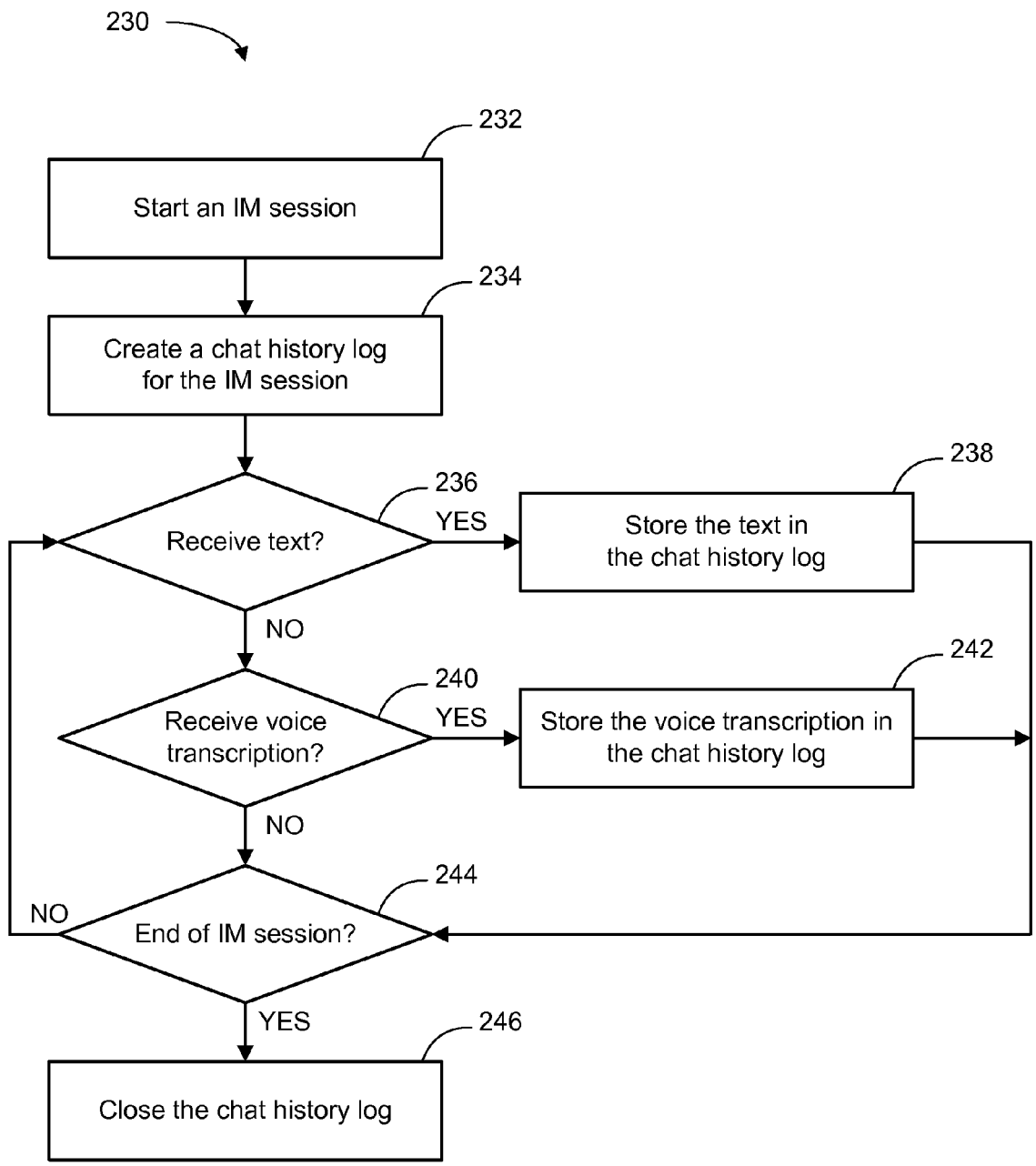
FIG. 7 depicts a schematic flow chart diagram of one embodiment of a method for adding voice transcription data to a chat history log during a voice chat session.

FIG. 7 depicts a schematic flow chart diagram of one embodiment of a method 230 for adding voice transcription data to a chat history log 132 during a voice chat session. For ease of explanation, the aggregation method 230 is described with reference to the IM system 100 of FIG. 1, the client computer 120 of FIG. 2, and the chat server 112 of FIG. 4. However some embodiments of the method 230 may be implemented with other IM systems, client computers, and/or chat servers.

In the illustrated aggregation method 230, the IM clients start 232 an IM session via the chat server 112. The IM clients also create corresponding chat history logs 132 (assuming the logging functionality is enabled) for the IM session. When the IM clients receive 236 text data from the chat server 112, the IM clients store 238 the text data in the chat history log 132. Similarly, when the IM clients receive 240 voice transcription data from the chat server 112, the IM clients store 242 the voice transcription data in the chat history log 242. In this way, the text data and the voice transcription data for the IM session are stored in the same chat history log 132 at each of the IM clients.

After storing the text data or the voice transcription data in the chat history log 132, the IM clients then determine 244 if the IM session is over. If the IM session is not over, then the IM clients continue to receive and store text data and/or voice data until the IM session ends. After the IM session ends, the IM clients close 246 the corresponding chat history logs 132 and the depicted aggregation method 230 ends.

Figure 8:
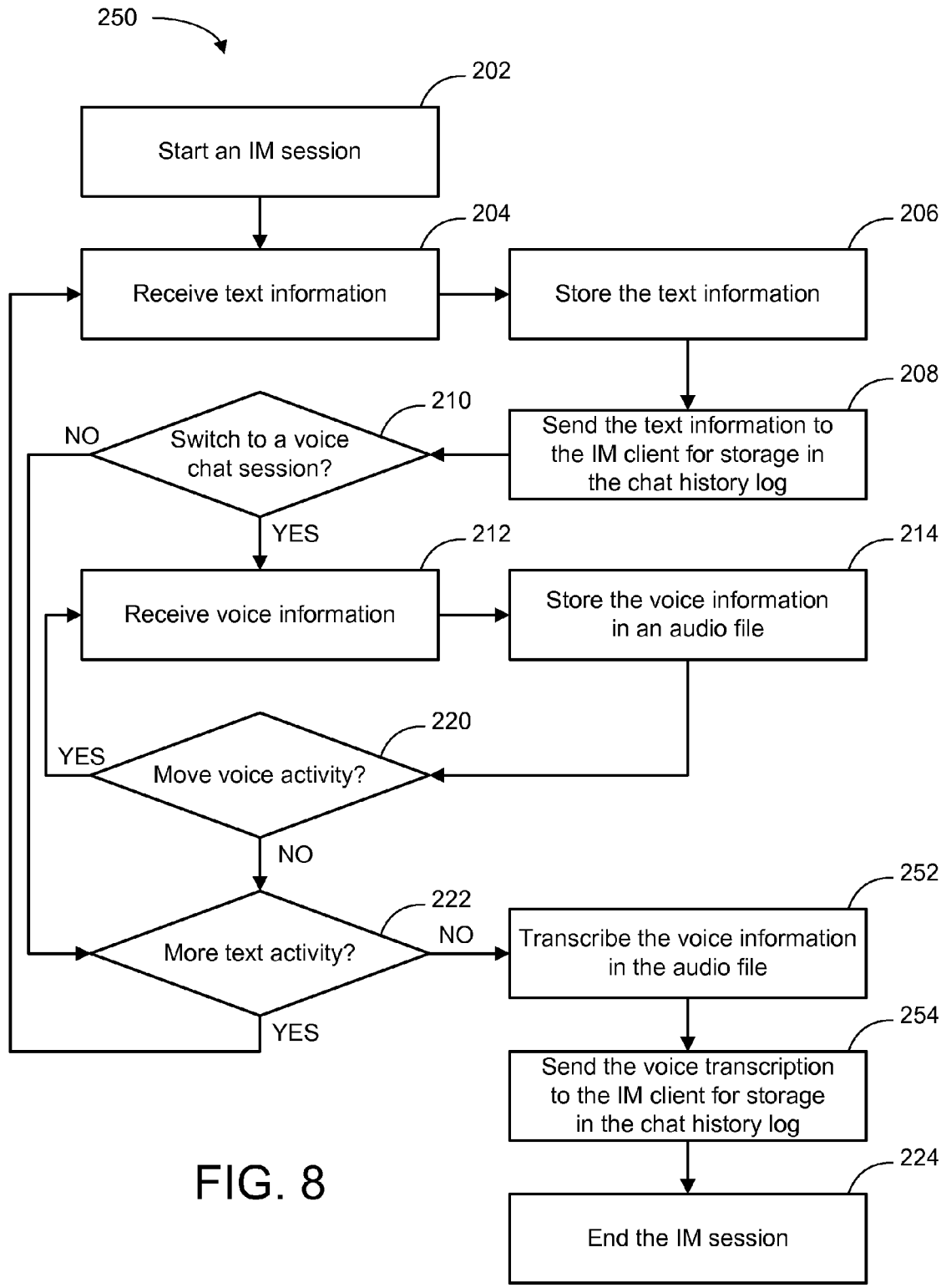
FIG. 8 depicts a schematic flow chart diagram of one embodiment of a method for transcribing voice information after a voice chat session.

FIG. 8 depicts a schematic flow chart diagram of one embodiment of a method 250 for transcribing voice information after a voice chat session. For ease of explanation, the voice transcription method 250 is described with reference to the IM system 100 of FIG. 1 and, in particular, to the chat server 112 of FIG. 4. However some embodiments of the voice transcription method 200 may be implemented with other IM systems and/or chat servers.

In the illustrated voice transcription method 250, many of the operations are the same as or substantially similar to the operations described above with reference to the voice transcription method 200 of FIG. 6. Hence, those operations are not described in additional detail herein. However, it should be noted that other embodiments of the voice transcription method 250 may omit some of the operations shown in FIG. 6, may alter the order of the operations shown in FIG. 6, or may include additional operations not included in FIG. 6.

In one embodiment, the voice transcription method 250 of FIG. 8 is different from the voice transcription method 200 of FIG. 6 because the voice transcription method 250 of FIG. 8 does not transcribe the voice information in the audio file until the voice and text activity are concluded. In particular, after the voice server 152 stores 214 the voice information in the audio file, the voice server 152 then determines 220 if there is additional voice activity and, if so, returns to receive 212 the additional voice information. Otherwise, if there is not additional voice activity, then the text server 150 determines 222 if there is additional text activity. If there is additional text activity, then the text server 150 returns to receive 204 the additional text information.

After all of the voice and text activities are concluded, the transcription engine 154 proceeds to transcribe 252 the voice information in the audio file to generate voice transcription data. In one embodiment, the voice server 152 stores the voice transcription data in the transcription memory 156. The voice server 152 then sends 254 the voice transcription data to each of the IM clients for storage in the corresponding chat history logs 132. Hence, the illustrated voice transcription method 250 continues processing text and voice information, and transcribes the voice information after the text and voice activities are concluded. The IM session then ends and the depicted voice transcription method 250 ends.

Figure 9:
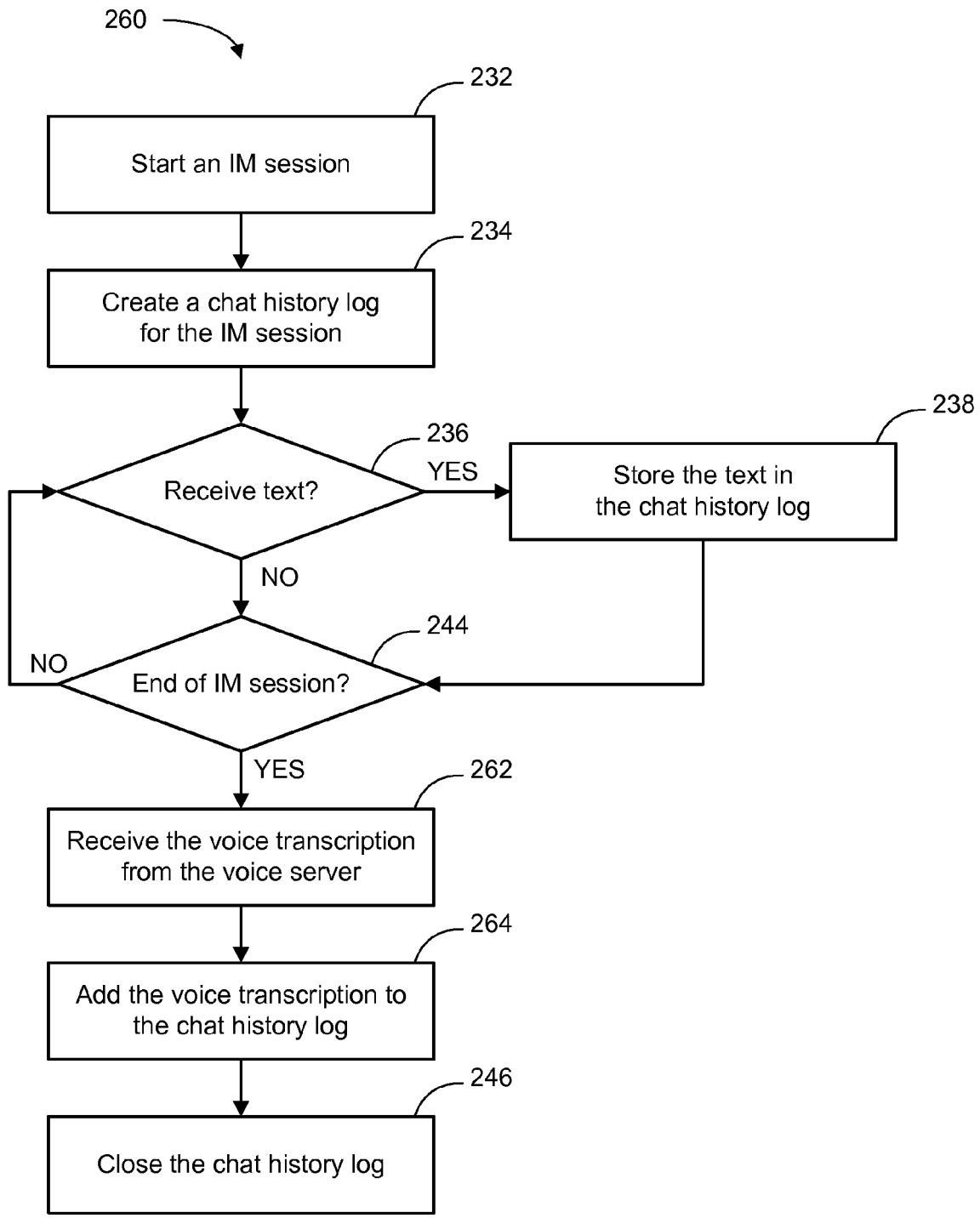
FIG. 9 depicts a schematic flow chart diagram of one embodiment of a method for adding voice transcription data to a chat history log after a voice chat session.

FIG. 9 depicts a schematic flow chart diagram of one embodiment of a method for adding voice transcription data to a chat history log 132 after a voice chat session. For ease of explanation, the aggregation method 260 is described with reference to the IM system 100 of FIG. 1, the client computer 120 of FIG. 2, and the chat server 112 of FIG. 4. However some embodiments of the aggregation method 260 may be implemented with other IM systems, client computers, and/or chat servers.

In the illustrated aggregation method 260, the IM clients start 232 an IM session via the chat server 112. The IM clients also create corresponding chat history logs 132 (assuming the logging functionality is enabled) for the IM session. When the IM clients receive 236 text data from the chat server 112, the IM clients store 238 the text data in the chat history log 132.

After storing the text data in the chat history log 132, the IM clients then determine 244 if the IM session is over. If the IM session is not over, then the IM clients continue to receive and store text data until the IM session ends. After the IM session ends, the IM clients receive 262 voice transcription data from the chat server 112. The IM clients subsequently store 264 the voice transcription data in the chat history log 132. In this way, the text data and the voice transcription data for the IM session are stored in the same chat history log 132 at each of the IM clients. The IM clients then close 246 the corresponding chat history logs 132 and the depicted aggregation method 260 ends.

It should also be noted that at least some of the operations for the methods 200, 230, 250, and 260 may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to transition between a text chat session and a voice chat session between multiple instant messaging clients, an operation to transcribe a voice stream of the voice chat session to generate voice transcription data associated with the voice chat session, and an operation to store the voice transcription data on a transcription memory coupled to a voice server.

Further embodiments of the computer program product include an operation to send the voice transcription data and text data to a first instant messaging client of the multiple instant messaging clients for storage in a chat history log. In some embodiments, the voice transcription data is associated with the voice chat session and the text data is associated with the text chat session. Another embodiment includes an operation to store the voice transcription data and the text data in the chat history log of the first instant messaging client. Another embodiment includes an operation to chronologically aggregate the text data and the voice transcription data according to timestamps associated with the text data and the voice transcription data.

Another embodiment of the computer program product includes an operation to add a voice transcription indicator to the chat history log to identify at least a portion of the voice transcription data in the chat history log. Another embodiment of the computer program product includes an operation to add a speaker indicator to the chat history log to associate portions of the voice transcription data with a user. Other embodiments of the computer program product may include operations to implement additional functionality, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
a chat server to facilitate a text chat session between multiple instant messaging clients;

a voice server coupled to the chat server, the voice server to facilitate a transition from the text chat session to a voice chat session between the multiple instant messaging clients, wherein the voice chat session comprises a transmission of a voice stream;

an audio memory coupled to the voice server, the audio memory to store an audio file of at least a portion of the voice stream of the voice chat session; and a transcription engine implemented on a computer and coupled to the voice server, the transcription engine to generate a voice transcription of the voice chat session and to delay transcription of the stored portion of the voice stream to continue processing text of the text chat session and voice of the voice chat session until after the text chat session and the voice chat session are concluded.

2. The system of claim 1, further comprising a client memory coupled to the voice server, the client memory to store a chat history log comprising a combination of text data from the text chat session and voice transcription data from the voice chat session.

3. The system of claim 2, wherein a first instant messaging client of the multiple instant messaging clients is coupled to the client memory, wherein the first instant messaging client is configured to chronologically aggregate the text data and the voice transcription data according to timestamps associated with the text data and the voice transcription data.

4. The system of claim 3, wherein the first instant messaging client is further configured to add a voice transcription indicator to the chat history log to identify the voice transcription data in the chat history log, wherein the voice transcription indicator identifies at least a beginning of the voice transcription data in the chat history log.

5. The system of claim 1, wherein the transcription engine is further configured to add a speaker indicator to the voice transcription to associate portions of the voice transcription with a user.

6. The system of claim 1, further comprising an audio memory coupled to the voice server, the audio memory to store an audio file of at least a portion of the voice stream of the voice chat session.

7. The system of claim 6, wherein the voice server is further configured to receive the voice stream from one of the multiple instant messaging clients, wherein the voice stream comprises a voice data transmission according to a voice over internet protocol.

8. An apparatus comprising:
a local instant messaging client to facilitate a chat session with a remote instant messaging client via a chat server, wherein the chat session comprises a transition between a text chat session and a voice chat session, wherein the voice chat session comprises a transmission of a voice stream; and a client memory to store a chat history log associated with the chat session between the local instant messaging client and the remote instant messaging client, wherein the local instant messaging client is further configured to aggregate text data and voice transcription data from the chat server into the chat history log, and wherein the client memory is configured to receive and store at least a portion of the voice transcription data after the voice chat session to continue processing the voice stream of the voice chat session.

9. The apparatus of claim 8, further comprising a display device coupled to the instant messaging client, the display device to display the chat history log to a user.

10. The apparatus of claim 8, wherein the instant messaging client is further configured to add a voice transcription indicator to the chat history log to identify at least a portion of the voice transcription data in the chat history log.

11. The apparatus of claim 8, wherein the instant messaging client is further configured to chronologically aggregate the text data and the voice transcription data according to timestamps associated with the text data and the voice transcription data.

12. A method comprising:
transitioning between a text chat session and a voice chat session between multiple instant messaging clients, wherein the voice chat session comprises a transmission of a voice stream;

storing an audio file of at least a portion of the voice stream of the voice chat session;

delaying transcription of the stored portion of the voice stream until after the voice chat session is concluded;

transcribing the stored portion of the voice stream of the voice chat session at a time that is later than the voice chat session to generate voice transcription data associated with the voice chat session; and storing the voice transcription data on a memory coupled to a voice server.

13. The method of claim 12, further comprising sending the voice transcription data and text data to a first instant messaging client of the multiple instant messaging clients for storage in a chat history log, wherein the voice transcription data is associated with the voice chat session and the text data is associated with the text chat session.

14. The method of claim 13, further comprising storing the voice transcription data and the text data in the chat history log of the first instant messaging client.

15. A computer program product comprising a computer useable storage medium to store a computer readable program that, when executed on a computer, causes the computer to perform operations comprising:
transition between a text chat session and a voice chat session between multiple instant messaging clients, wherein the voice chat session comprises a transmission of a voice stream;

store an audio file of at least a portion of the voice stream of the voice chat session;

delay transcription of the stored portion of the voice stream until after the voice chat session is concluded;

transcribe the stored portion of the voice stream of the voice chat session at a time that is later than the voice chat session to generate voice transcription data associated with the voice chat session; and store the voice transcription data on a memory coupled to a voice server.

16. The computer program product of claim 15, wherein the computer readable program, when executed on the computer, causes the computer to perform an operation to send the voice transcription data and text data to a first instant messaging client of the multiple instant messaging clients for storage in a chat history log, wherein the voice transcription data is associated with the voice chat session and the text data is associated with the text chat session.

17. The computer program product of claim 16, wherein the computer readable program, when executed on the computer, causes the computer to perform an operation to store the voice transcription data and the text data in the chat history log of the first instant messaging client.

18. The computer program product of claim 17, wherein the computer readable program, when executed on the computer, causes the computer to perform an operation to chronologically aggregate the text data and the voice transcription data according to timestamps associated with the text data and the voice transcription data.

19. The computer program product of claim 17, wherein the computer readable program, when executed on the computer, causes the computer to perform an operation to add a voice transcription indicator to the chat history log to identify at least a portion of the voice transcription data in the chat history log.

20. The computer program product of claim 17, wherein the computer readable program, when executed on the computer, causes the computer to perform an operation to add a speaker indicator to the chat history log to associate portions of the voice transcription data with a user.

* * * * *